Patented July 28, 1953

2,647,118

UNITED STATES PATENT OFFICE 2,647,118

METHOD FOR PREPARING BIS-(SUBSTI-
TUTED TETRAHYDRO - 1,3 - OXAZINO)-
METHANES

Howard D. Hartough, Pitman, Joseph J. Dickert, Jr., Westville, and Seymour L. Meisel, West Deptford Township, Gloucester County, N. J., assignors to Socony-Vacuum Oil Company, Incorporated, a corporation of New York No Drawing. Application June 22, 1950, Serial No. 169,792

3 Claims. (Cl. 260—246)

In the co-pending application for United States Letters Patent Serial No. 129,948, filed November 29, 1949, in the names of Howard D. Hartough, J. J. Dickert, Jr., and Seymour L. Meisel, the preparation of formaldimines, substituted tetrahydro-1,3-oxazines, and bis-(substituted tetrahydro-1,3-oxazino)-methanes has been described. The present invention relates to an improvement in the method described in the aforesaid disclosure whereby increased yields of bis-(tetrahydro-1,3-oxazino)-methanes are obtained.

In the aforesaid application Serial No. 129,948, it was disclosed that when an olefinic compound having a composition

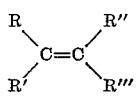

is reacted with formaldehyde, either as a 35 to 38 per cent aqueous solution of formaldehyde or as a reversible polymer thereof together with a depolymerizer, and a hydrohalide of ammonia or a primary amine or a primary diamine a series of compounds are formed dependent upon molal proportion of the formaldehyde to the olefinic compound. That is to say, when the olefinic compound

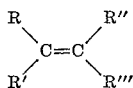

is reacted with ammonium halide, NH$_3$HX, and formaldehyde in the molal proportion of 2:2:4 the formaldimine and the substituted tetrahydro-1,3-oxazine are formed in accordance with Equation 1.

(1)

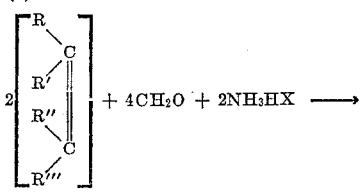

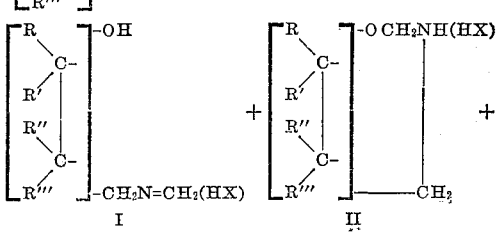

When the molal proportions of olefinic compound, ammonium halide and formaldehyde are 2:2:5 or amine IIa, the basic amine resulting from the removal of (HX) from derivative II, is reacted in acid solution with another 0.5 mole of formaldehyde the N-methylol derivative III of II is obtained in accordance with the Equation 2.

(2)

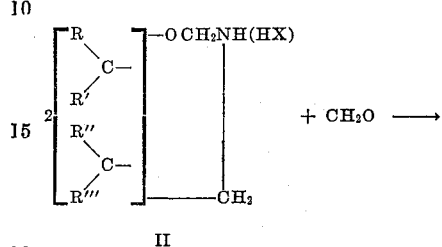

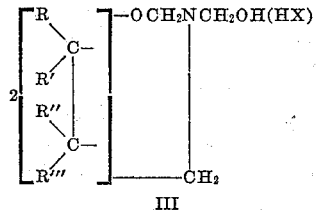

The reactions illustrated by Equations 1 and 2 require that 5 moles of formaldehyde react with 2 moles of olefinic compound and 2 moles of ammonium halide in order to produce the compound V, i. e., a mole ratio of 2.5:1:1. However, an amount of formaldehyde in excess of the required formaldehyde:olefin:ammonium halide ratio of 2.5:1:1 is preferred, since an excess of formaldehyde leads to increased yields of compound V.

When compound III reacts with formaldehyde compound IV is formed by the reductive action of the formaldehyde in a manner which can be represented by Equation 3.

(3)

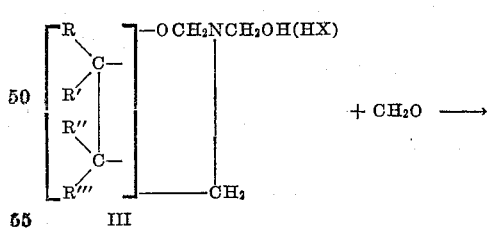

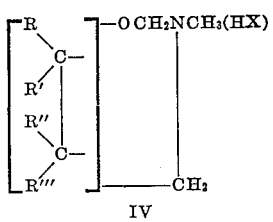

Compound III can also react with another mole of compound II forming compound V by the elimination of water in a manner which can be represented by Equation 4.

(4)

$$\left[\begin{array}{c}R\\R'\\R''\\R'''\end{array}C-\atop C-\right]-OCH_2NCH_2OH(HX)\atop CH_2 + \left[\begin{array}{c}R\\R'\\R''\\R'''\end{array}C-\atop C-\right]-OCH_2NH(HX)\atop CH_2 \longrightarrow$$

$$\left[\begin{array}{c}R\\R'\\R''\\R'''\end{array}C-\atop C-\right]-OCH_2N-CH_2-NCH_2O-\left[\begin{array}{c}R\\R'\\R''\\R'''\end{array}\right]+H_2O\atop CH_2\quad CH_2$$

V

It has now been discovered that the yield of V, i. e., bis-(tetrahydro-1,3-oxazino)-methanes as the free amines can be markedly improved by employing low operating temperatures; e. g., below 100° C. and preferably below 70° C., and above 55° C., a short reaction time of the order of about 25–30 minutes and an amount of formaldehyde in excess of the molal proportion of 1 to 1 mole of olefinic compound, $RR'C=R''R'''$, say 4 moles of formaldehyde to 1 mole of olefinic compound.

*Example I*

Thus, for example, when 0.5 mole of styrene, 2 moles of formaldehyde (as 36 per cent aqueous solution) and 1 mole of ammonium chloride are reacted at about 75°–80° C. for about 30 minutes, cooled, unreacted styrene removed, the aqueous layer causticized with about 1 mole of sodium hydroxide (as a 20 per cent aqueous solution) and the causticized aqueous solution extracted with ethyl ether, i. e., a solvent for type V compounds, evaporation of the ether yielded about 0.13 mole of bis-(phenyl-substituted-tetrahydro-1,3-oxazino)-ethane,

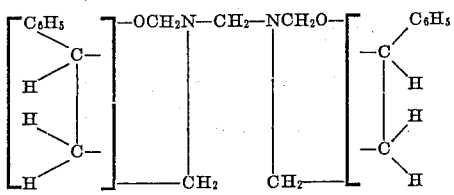

($C_{21}H_{26}N_2O_2$, mol. wt. calculated 338). Since the theoretical yield of compound V from 0.5 mole of styrene is 0.25 mole it is manifest that the aforementioned yield of 0.13 mole is about 52.0 per cent of theory. The product analyzed: Carbon — 74.11%; hydrogen — 7.75%; nitrogen — 8.31%; compared with the calculated values for $C_{21}H_{26}N_2O_2$ of carbon — 74.55%; hydrogen — 7.69%; nitrogen — 8.28%; and a molecular weight (boiling point method) of 376.

*Example II*

About five moles of styrene, about 20 moles of formaldehyde (as a 36 per cent aqueous solution) and about 10 moles of ammonium chloride were mixed and stirred vigorously. The reaction mixture so obtained was then warmed to 60° C. in about 30 minutes and held at a reaction temperature between 60° and 63° C. for about 27 minutes by means of external cooling. After about 20 minutes the reaction temperature began to drop and the reaction mixture was allowed to cool to room temperature. The reaction mixture stratified into an organic layer and an aqueous layer. The organic layer, amounting to about 13.9 weight per cent of the charge, was separated from the aqueous layer. This organic layer contains unreacted styrene and substituted-1,3-dioxane. The aqueous layer was extracted with ethyl ether and about 0.52 weight per cent of the charge recovered. This material was formaldehyde with small amounts of substituted 1,3-dioxane.

The extracted aqueous layer was then causticized with about 10 moles of sodium hydroxide (as 40 per cent aqueous solution).

About 10.2 weight per cent of the charge separated as an organic layer and was recovered. The aqueous layer was extracted with ethyl ether and about 2.2 weight per cent of the charge recovered. The organic material recovered from the extract of the causticized aqueous solution was combined with the organic material which separated upon causticizing the reaction mixture and the whole dissolved in about 75 per cent as much ethanol (by weight). The ethanol-oil mixture was warmed on a steam-bath (70–80° C.) for about 20 minutes and allowed to stand at room temperature (25°). The process of crystallization requires several days but can be accelerated by removing the crystals as they are formed. The crude crystals were recrystallized from ethanol and about 5.3 weight per cent of the charge recovered as crystals having a melting point of 126°–127° C. The alcohol from which the crystals were first obtained was evaporated and about 4.75 weight per cent of the charge recovered as an oil comprising compounds of other types which are produced in this reaction.

*Example III*

About 0.04 mole of phenyl substituted tetrahydro-1,3-oxazine hydrochloride, about 0.018 mole of formaldehyde (as 36 per cent aqueous solution) and an equal amount of alcohol were mixed and heated to reflux on a steam-bath for about one hour. The mixture was then cooled to room temperature. Thereafter the alcoholic reaction mixture was seeded with a crystal of authentic bis-(phenyl-substituted-tetrahydro - 1,3 - oxazino)-methane whereupon crystallization began almost immediately. The crystals were separated from the mother liquor. A mixed melting point of a mixture of these crystals with crystals from an authentic sample of bis-(phenyl-substituted-tetrahydro-1,3-oxazino)-methane showed no depression of the melting point. About 25 per cent more crystals were obtained by concentration of the mother liquor.

The foregoing procedure establishes that compound V can be prepared from compound III.

In the manner described in Example II the effect upon the yield of crystalline compound V of the reaction time at a temperature appreciably above or below 60° C. was investigated. The following tabulation presents the results:

temperatures about 60° C. and preferably at reflux temperature for periods of time in excess of

EFFECT OF TIME AND TEMPERATURE ON YIELD OF V

| Run No. | Molal Proportions of Reactants | | | Temperature, °C. | Time Reaction, Temperature Above 60° C. | Recovered Organic Layer, Percent of Charge ¹ | Basic Portion, Percent of Organic Layer | Crystalline Portion, Percent of Organic Layer | Crystalline Portion (V), Percent of Charge |
|---|---|---|---|---|---|---|---|---|---|
| | $R\diagdown_{R'}C=C\diagup^{R''*}_{R'''}$ | $CH_2O$ | $NH_3(HX)$ | | | | | | |
| 51 | 1 | 4 | 2 | Heated to 53° C.; kept between 50° and 53° C. by external cooling. | 0 | 15.2 | 29.0 | 28.5 | 4.34 |
| 50 | 1 | 4 | 2 | Heated to 60° C.; kept between 60° and 63° C. by external cooling. | 27 minutes | 13.9 | 34.1 | 39.6 | 5.51 |
| 48 | 1 | 4 | 2 | Heated to 65° C.; temperature rose to 74° C. | 50 minutes | 12.3 | 57.2 | 37.3 | 4.59 |
| 49 | 1 | 4 | 2 | Heated to 60° C.; temperature rose to 74° C. | 70 minutes | 11.8 | 59.1 | 36.2 | 4.27 |
| 52 | 1 | 2.24 | 1.11 | Heated to reflux 80°–83° C. | 6 hours | 14.3 | (³) | 0 | 0 |
| 53 | 1 | 2.24 | 1.11 | do | 24 hours | ² 5.7 | (³ ⁴) | 0 | 0 |

¹ Contains undetermined amounts of 4-substituted-1,3-dioxane.
² Mostly unreacted RR'C=CR''R'''.
³ Prolonged heating led to the formation of large amounts of the N-methyl derivative of the substituted tetrahydro-1,3-oxazine.
⁴ Picrate showed the material to be partially N-methyl-substituted tetrahydro-1,3-oxazine.

*R=C₆H₅
R'=H
R''=H
R'''=H

The foregoing data established that when an olefinic compound, RR'C=CR''R''' as defined herein is reacted with formaldehyde and an ammonium halide in molal proportions in excess of 1:2:2, the yield of crystalline bis-(substituted-tetrahydro-1,3-oxazino)-methane is affected by the residence time at temperatures above 60° C. but below about 70° C. and that a maximum yield of crystalline bis-methane is obtained when a residence time is of the order of 25 to 30 minutes.

Methylene bridge derivatives of olefinic compounds having a composition represented by the formula RR'C=CR''R''' can be prepared from a variety of olefinic compounds. However, it is to be noted that the bis-methane derivatives are not all readily crystallizable. Thus, for example, the bis-methane derivatives of neopentyl-methyl-tetrahydro-1,3-oxazine (from diisobutylene, formaldehyde and ammonium chloride) and the bis-methane derivative of dimethyltetrahydro-1,3-oxazine (from isobutylene, formaldehyde and ammonium chloride) were prepared in the manner described in Example III. However, the bis-methane derivatives could not be crystallized.

It is also to be noted that the data presented in the foregoing tabulation establishes that when the olefinic compound RR'C=CR''R''', formaldehyde and ammonium chloride are reacted in molal proportions of less than 1:4:2 and subjected to prolonged heating, large amounts of the N-methyl derivative of the substituted tetrahydro-1,3-oxazine,

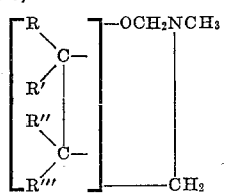

are obtained. Thus, to obtain maximum yields of the N-methyl-substituted-tetrahydro-1,3-oxazines the olefinic compound RR'C=CR''R''' should be reacted with less than 4 moles of formaldehyde and less than 2 moles of ammonium halide per mole of olefinic compound and the reaction mixture subjected to prolonged heating at two hours and preferably of the order of four to eight hours.

In the foregoing it has been established that prolonged heating of an olefinic compound, formaldehyde and ammonium halide in a molal proportion such that there are less than four moles of formaldehyde and less than two moles of ammonium halide per mole of olefinic compound yields only an oil and no recoverable crystalline bis-methane. It will now be established that the oil formed is primarily N-methyl-substituted-tetrahydro-1,3-oxazine,

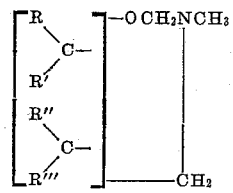

An authentic sample of N-methyl-phenyl substituted-tetra-hydro-1,3-oxazine was prepared in the manner described in Example VII of copending application Serial No. 129,948 from styrene, formaldehyde and methylamine hydrochloride. The product of the reaction of these materials formed a crystalline picrate when treated with picric acid. After three recrystallizations from ethanol the picrate melted at 160°–161° C. The analyses of the picrate checked with the calculated values for C₁₇H₁₈N₄O₈ as is evident from the following data:

| | Percent Carbon | Percent Hydrogen | Percent Nitrogen |
|---|---|---|---|
| Calculated for C₁₇H₁₈N₄O₈ | 50.25 | 4.43 | 13.79 |
| Observed | 50.21 | 3.55 | 14.34 |

The material prepared as described in the following example was shown to be the same since the mixed melting point for the mixture of the picrate of the N-methyl-phenyl substituted tetrahydro-1,3-oxazine prepared from methylamine hydrochloride and of the picrate of the N-methyl-phenyl substituted tetrahydro-1,3-oxazine prepared as described in Example IV showed no depression.

Example IV

About 10 moles of styrene $C_6H_5CH=CH_2$, about 21.6 moles of formaldehyde (36 per cent aqueous solution) and about 11.1 moles of ammonium halide were mixed together and warmed to about 65° C. The reaction temperature rose to about 83° C. and was maintained at that level by external cooling. After about 30 minutes, when the heat of reaction had subsided, the material was heated to reflux for about 24 hours. The amine was isolated by extracting the reaction mixture after removal of the organic layer with ethyl ether and causticizing the extracted reaction mixture with sodium hydroxide and separating the free, substantially water-insoluble, amine. The amine was distilled in vacuo.

A small portion of the distilled amine was shaken for fifteen minutes with about 2.6 times by weight as much aqueous 9 per cent hydrochloric acid and the mixture extracted with ethyl ether. Evaporation of the ether yielded a neutral material in 50 per cent yield based on the amount of distilled amine treated. Distillation of the material thus obtained established that it was predominantly phenyl substituted-1,3-dioxane,

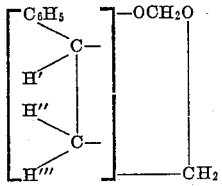

The aqueous layer was causticized with aqueous sodium hydroxide and extracted with ethyl ether. The ether extract was dried and the solvent evaporated to leave a residue equal substantially to 50 per cent by weight of distilled amine. Most of this material distilled at 76°–80° C. at a pressure of 0.4 millimeters of mercury and had a refractive index $n_D^{20}$ of 1.5280. This material was analyzed; the observed values and the calculated values for N-methyl-phenyl substituted tetrahydro-1,3-oxazine follow:

|  | Calculated for $C_{11}H_{15}NO$ | Observed |
|---|---|---|
| Percent Carbon | 74.5 | 73.18 |
| Percent Hydrogen | 8.46 | 8.47 |
| Percent Nitrogen | 7.91 | 7.83 |

A picrate was made of the crude distilled amine; i. e., material from which m-dioxane had not been removed; the picrate had a melting point of 157°–158° C. The picrate was analyzed with the results set forth hereinafter:

|  | Nitrogen, Percent |
|---|---|
| Calculated for $C_{17}H_{18}N_4O_8$ | 13.79 |
| Observed | 13.23 |

This picrate was mixed with the picrate of authentic N-methyl-phenyl substituted tetrahydro-1,3-oxazine (prepared as described hereinbefore) and the melting point found to be 157°–158° C.; i. e., no depression of the melting point was observed.

In a similar manner the yields of bis-methane compounds of the various olefinic compounds enumerated in the co-pending application mentioned hereinbefore can be increased by applying the principles of the present invention to the disclosure of the co-pending application. Thus, the following bis-methanes can be prepared in increased yields as compared to those obtained by following the procedure disclosed in the aforesaid co-pending application: bis-(dimethyl-tetrahydro-1,3-oxazino)-methane from isobutylene; bis - (methyl - phenyl - tetrahydro - 1,3 - oxazino) - methane; bis - (ethylhexyl - tetrahydro-1,3 - oxazino) - methane; bis - (methylpentyl-tetrahydro - 1,3 - oxazino) - methane; bis-(ethyl - butyl - 1,3 - tetrahydro - oxazino)-methane; bis - (methyl - isopropyl - tetrahydro-1,3-oxazino)-methane; and others such as described in the co-pending application Serial No. 129,948 to which reference has been made hereinbefore. In general, the hereindescribed method is useful for preparing in improved yield the bis - (substituted - tetrahydro - 1,3 - oxazino)-methanes described in the aforesaid co-pending application from olefinic compounds having a composition corresponding to the formula

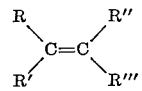

in which R is hydrogen, an alkyl group having less than 17 carbon atoms, an aryl group, an alkaryl group in which the alkyl substituent has less than 9 carbon atoms, an aralkyl group in which the alkyl portion of the group has less than 9 carbon atoms, a cycloalkyl group, and a heterocyclic group; R' is R, hydrogen, an alkyl group having less than 17 carbon atoms, an aryl group, an alkaryl group in which the alkyl substituent has less than 9 carbon atoms, an aralkyl group in which the alkyl portion of the group has less than 9 carbon atoms, a cycloalkyl group, and a heterocyclic group, R'' is R, R', hydrogen, an alkyl group having less than 17 carbon atoms, an aryl group, an alkaryl group in which the alkyl substituent has less than 9 carbon atoms, an aralkyl group in which the alkyl portion of the group has less than 9 carbon atoms, a cycloalkyl group, and a heterocyclic group; and R''' is R, R', R'', hydrogen, an alkyl group having less than 17 carbon atoms, an aryl group, an alkaryl group in which the alkyl substituent has less than 9 carbon atoms, an aralkyl group in which the alkyl portion of the group has less than 9 carbon atoms, a cycloalkyl group, and a heterocyclic group. Furthermore, when any of R, R', R'' and R''' is other than H or $CH_3$, it may be substituted with such groups as $NO_2$, CN, X, COOH, etc. (X=Cl, Br or I). These substituents preferably are removed by at least 2 carbon atoms from the olefinic moiety. However, there are two limitations, to wit: no more than three and preferably, only two, of R, R', R'' and R''' may be substituents other than hydrogen and when one of the pair of substituents, R, R' or R'', R''' is hydrogen and the other substituents, R'' and R''' or R and R' are hydrogen, then the other member of the pair shall be a substituent having a double bond in conjugation with the double bond of the parent olefin. Thus, for example, when R or R' is hydrogen and R'' and R''' are hydrogen, the other substituent shall be a substituent having a double bond in conjugation with the double bond in the parent olefin. Similarly, when R'' or R''' is hydrogen and R and R' are hydrogen, the other substituent shall be one having a double bond in conjugation with the double bond of the parent olefin. In the aforesaid co-pending application Serial No. 129,948 the following olefinic compounds, coming within the scope of the class defined hereinbefore, are enumerated: styrene, Δ9,11-linoleic acid, eleostearic acid, Δ9,11,13-octadecatrienoic acid, and similar carboxylic acids having two or more conjugated double bonds, methacrylic acid, isocrotonic acid, vinyl sulfones, vinyl ethers, vinyl thioethers and vinyl halides, diisobutylene, alpha-methyl styrene, isobutylene, 1-butene, a mixture of divinylbenzene, diethylbenzene and ethylvinylbenzene, 2-ethyl-1-hexene, 2-methyl-1-pentene, 2-ethyl-1-butene, allyl alcohol, betapinene, dipentene, 2-ethyl-2-butene, 2,3-dimethyl - 1 - butene, 2,3 - dimethyl - 1 - pentene, 2-methyl-1-heptene, 2,3-dimethyl-1-hexene, 2,3,4 - trimethyl - 1 - pentene, 3 - methyl - 2 - isopropyl - 1 - butene, 2 - methyl - 2 - undecene, 2 - methyl - 2 - heptadecene, 1 - phenyl - 1-butene, 2 - phenyl - 4 - methyl - 2 - hexene, 2-cyclopropyl - 1 - propene, 1 - isopropenyl - 2-methyl - 3 - cyclohexene, 1 - methyl - 4 - isopropenyl - 1 - cyclohexene, 1,2 - diphenylethylene, vinylphenol, 3-vinylguaiacol, vinylacrylic acid, propenylguaiacol, 2-vinylthiophene, 2-methyl - 4 - vinylthiophene, 1 - furyl - 1 - butene, vinylpyridine, 1-pyrryl-1-propene, halogenated vinyl sulfones such as alpha-chlorovinyl-beta-chloroethyl sulfone, aryl and alkyl vinyl sulfones such as benzylpropenyl sulfone, dimethylallyl ether, vinyl thioether, vinyl halides, such as $CH_2=CHCl$, $CH—CH_2Br$, $(CH_3)_2C=CHBr$.

We claim:
1. A process for obtaining improved yields of bis-methanes having the formula,

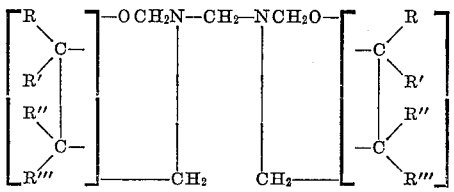

which comprises reacting an olefinic compound having the formula, $RR'C=CR''R'''$, with formaldehyde and an ammonium halide, in a molar proportion of at least 2.5 moles of formaldehyde per mole of said olefinic compound, at a temperature of between about 55° C. and about 70° C., and for a period of time of between about 25 minutes and about 30 minutes; $R,R',R''$, and $R'''$ being selected from the group consisting of hydrogen atoms, alkyl radicals having not more than 16 carbon atoms, hydroxyalkyl radicals, carboxyalkyl radicals, oxoalkyl radicals, a phenyl radical, alkaryl radicals having not more than 8 carbon atoms in the alkyl group thereof, alkenylaryl radicals having not more than 8 carbon atoms in the alkenyl group thereof, thienyl radicals, furyl radicals, and pyridyl radicals.

2. A process for obtaining improved yields of bis - (phenyltetrahydro - 1,3,-oxazino)-methane, which comprises reacting styrene, formaldehyde, and ammonium chloride in a molar proportion of at least 2.5:1:1, respectively, at a temperature of between about 60° C. and about 65° C., and for a period of time of between about 25 minutes and about 30 minutes.

3. A process for obtaining improved yields of bis - (dimethyltetrahydro - 1,3 - oxazino) - methane, which comprises reacting isobutylene, formaldehyde, and ammonium chloride in a molar proportion of at least 2.5:1:1, respectively, at a temperature of between about 60° C. and about 65° C., and for a period of time of between about 25 minutes and about 30 minutes.

HOWARD D. HARTOUGH.
JOSEPH J. DICKERT, Jr.
SEYMOUR L. MEISEL.

References Cited in the file of this patent

UNITED STATES PATENTS

| Number | Name | Date |
|---|---|---|
| 1,726,713 | North | Sept. 3, 1929 |
| 2,114,121 | Bender | Apr. 12, 1938 |
| 2,243,295 | Susie et al. | May 27, 1941 |
| 3,319,848 | Clark et al. | May 25, 1943 |
| 2,447,822 | Senkus | Aug. 24, 1948 |
| 2,453,086 | Caesar | Nov. 2, 1948 |
| 2,458,526 | Oberright | Jan. 11, 1949 |

OTHER REFERENCES

Lukasiewiez et al., J. Am. Chem. Soc., vol. 68, pp. 1389–1390 (1946).

Kohn, Monatshefte, vol. 25 (1904) pp. 819 and 841 (complete article p. 817–849).